Figure 1:
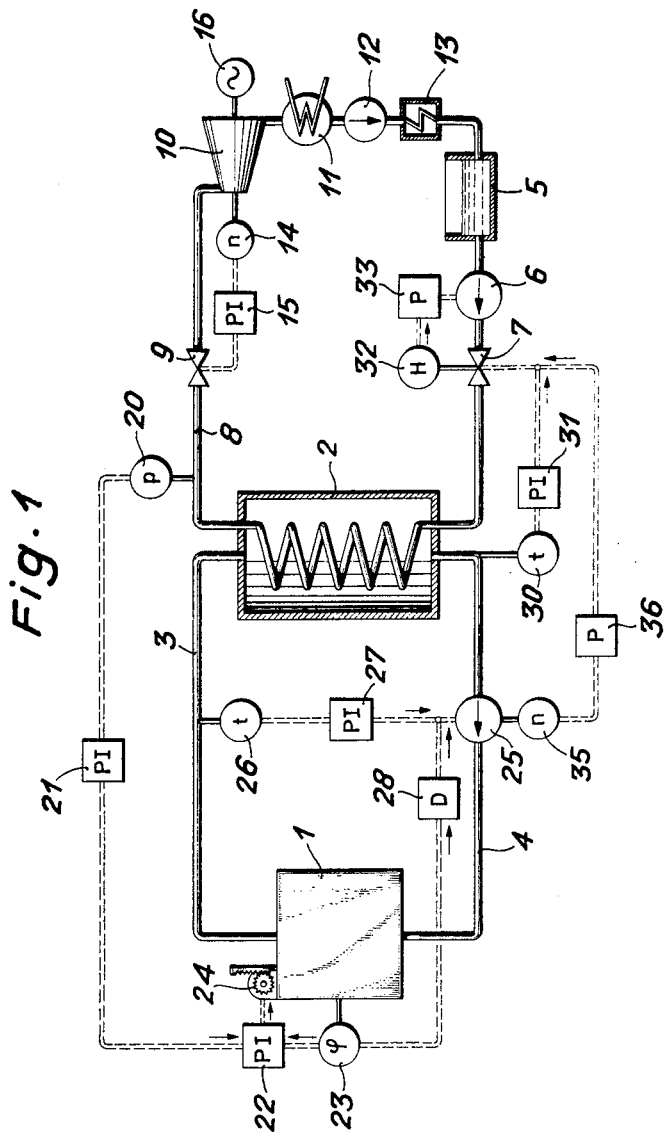

June 7, 1966  P. DOROSZLAI  3,255,084
METHOD AND APPARATUS FOR CONTROL OF A NUCLEAR POWER PLANT
Filed May 15, 1964  4 Sheets-Sheet 1

Inventor:
Pal Doroszlai
BY Pennie, Edmonds,
Morton, Taylor and Adams
ATTORNEYS

June 7, 1966 P. DOROSZLAI 3,255,084
METHOD AND APPARATUS FOR CONTROL OF A NUCLEAR POWER PLANT
Filed May 15, 1964 4 Sheets-Sheet 4

*Inventor:*
Pal Doroszlai
BY
ATTORNEYS

United States Patent Office 3,255,084
Patented June 7, 1966

3,255,084
METHOD AND APPARATUS FOR CONTROL OF A NUCLEAR POWER PLANT
Pal Doroszlai, Zurich, Switzerland, assignor to Sulzer Brothers Limited, Winterthur, Switzerland, a Swiss company
Filed May 15, 1964, Ser. No. 367,694
Claims priority, application Switzerland, May 17, 1963, 6,256/63
11 Claims. (Cl. 176—20)

This invention pertains to a method and apparatus for the control of a nuclear power plant. According to the invention a reactor cooling medium or coolant, advantageously of gaseous form, circulates in at least one closed cooling cycle and surrenders its heat in at least one heat exchanger to a vaporizable working substance which flows in at least one working cycle. The temperature of the reactor cooling medium on exit from the reactor is held substantially constant, and the quantity of working substance passing through the heat exchanger is controlled in accordance with the temperature of the reactor cooling medium on exit from the exchanger. The invention further pertains to apparatus for practice of this method.

Reactor power plants are known in which even with varying power output, both the exit and entrance temperatures of the cooling medium from and to the reactor are held as nearly constant as possible. In such known installations, the control of the reactor cooling medium to a constant temperature at the inlet to the heat exchanger may be effected by change in the quantity of cooling medium (usually gaseous) passing through the reactor per unit time, i.e. by variation of the flow of cooling medium, whereas control of the temperature of the cooling medium emerging from the heat exchanger is effected by control of the rate of flow of working substance through that exchanger, this working substance absorbing the heat of the reactor cooling medium in that exchanger. The term "flow" is here to be understood as the quantity flowing per unit time across a given cross-section or through a particular portion of the system.

Process or system control when dependent on temperature is in general afflicted with inertia or time lag. Hence, with changes of load on the plant, such known reactor power plant control systems which are dependent on temperature of the reactor cooling medium exhibit substantial variations of the temperature of the reactor cooling medium as it leaves the heat exchanger. These variations in temperature may give rise to thermal shock in the reactor, the coolant of such varying temperature being, of course, returned to the reactor since it flows in a closed cycle.

In order to minimize the variations in temperature of the reactor cooling medium upon exit from the heat exchanger, without introducing instability of operation, the invention proposes, upon variation in reactor output, to adjust the rate of flow of working substance through the heat exchanger in supplementary fashion with a suitably adjusted signal representative of such change in output. In order that this supplementary signal may be rapid in operation or effectiveness, it is desirable to make it proportional to the power output of the reactor. In order to achieve proper time of attack or effectiveness of the supplementary signal, which time must not be too early, it is important that that signal be not derived directly in dependence on a change in the demand load, as for example in a pre-programmed control system, nor from a change in the load in the working substance cycle, but rather that it should be developed either with delay or in dependence on the changed reactor output which depends in turn on the change in load.

To this end it is advantageous so to construct the control system that the supplementary signal for control of the rate of flow of working substance through the heat exchanger should be derived in dependence on the rate of flow of reactor cooling medium in the reactor cooling circuit and/or in dependence on the rate of flow of neutrons measured in the reactor itself. In one advantageous embodiment of the invention, the supplementary signal is derived from the rate of rotation of the pump or other drive means which forces the reactor cooling medium along its path of circulation.

Moreover, tests carried out with the help of an analogue computer have shown that upon changes of load, oscillations unavoidably occurring in the regulation, such as for example in steam temperature and pressure of the working substance (in the case of steam), or in the temperature of the reactor cooling medium downstream of the heat exchanger, may be substantially reduced in amplitude if the rate of flow of working substance through the heat exchanger is adjusted by means of a still further signal, additional to that derived from the reactor output, which further signal is so derived from the shift in the steaming end point of the working substance in the heat exchanger that it opposes those oscillations.

The effect of change of the steaming end point of the working substance can be derived with the help of temperature measurements at one or more locations in the heat exchanger. It is also possible to measure the temperature at plural points in the vaporization zone of the working substance, these points being distributed along the direction of streaming of the working substance through the exchanger. In such case the measured values are summed and delivered to the servomechanism which controls the rate of flow of working substance through the heat exchanger.

This signal representative of shift of steaming end point is arranged to work without delay on control of the rate of flow of working substance. Since over the long term this rate of flow is determined by the slowly operating control circuit, of proportional and integral character, responsive to the temperature of the reactor cooling medium leaving the heat exchanger, the signal derived from shifts of the steaming end point can be made operative on the servomechanism for control of rate of flow of working substance either via a proportionally operating or via a differentially operating element.

Instead of measuring the temperature in the heat exchanger it is also possible to measure the rate of change of temperature $dT/dt$ at the various points by means of temperature trend indicators. The measured values so obtained can, before delivery of the resulting signal to the servomechanism, be either summed or supplied to a maximum signal selecting device.

Apparatus for carrying out the method of invention is characterized by the fact that one or more devices for measurement, control, and regulation are provided by means of which a signal representative of the output of the reactor is applied to the servomechanism for control of the rate of flow of working substance through the heat exchanger.

Figure 2:
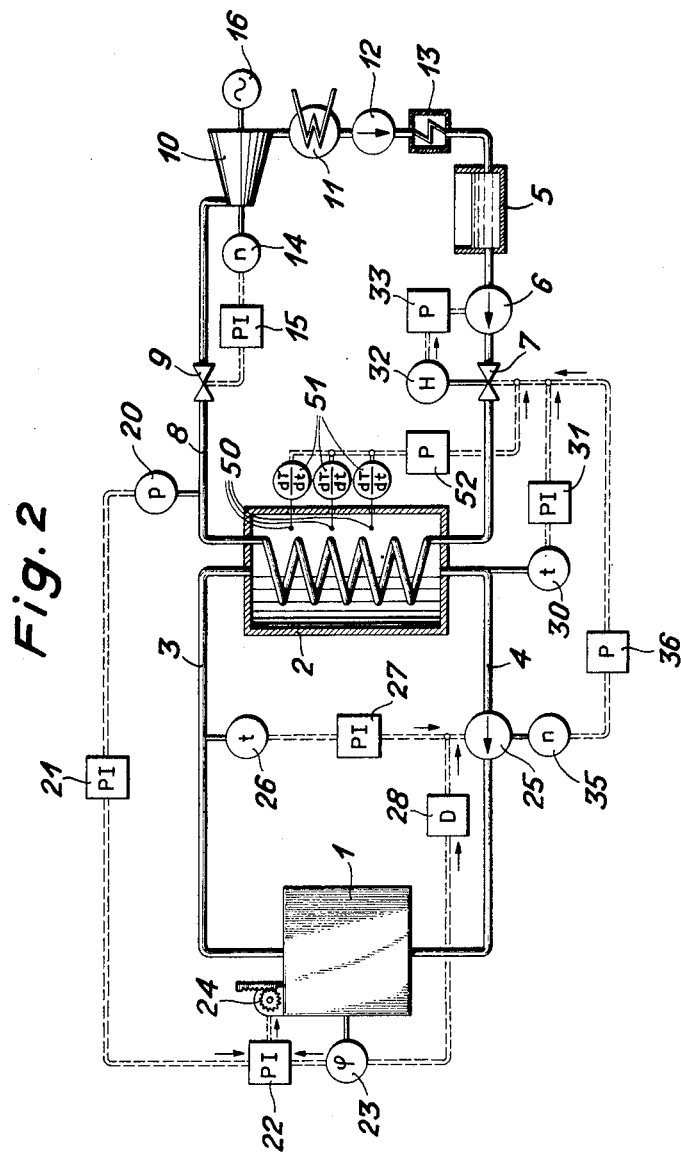
Figure 3:
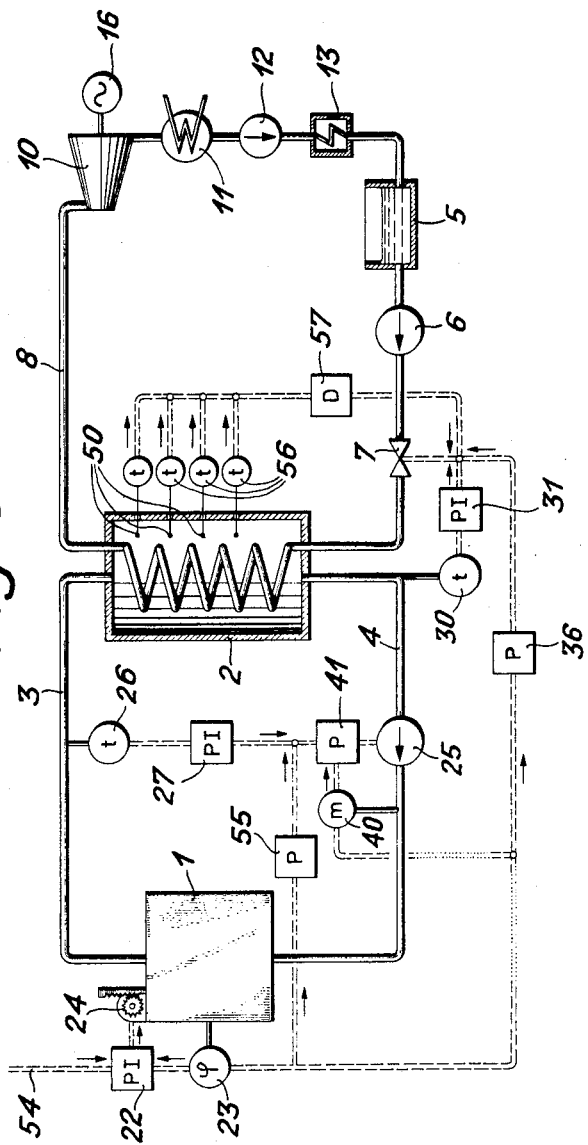
Figure 4:
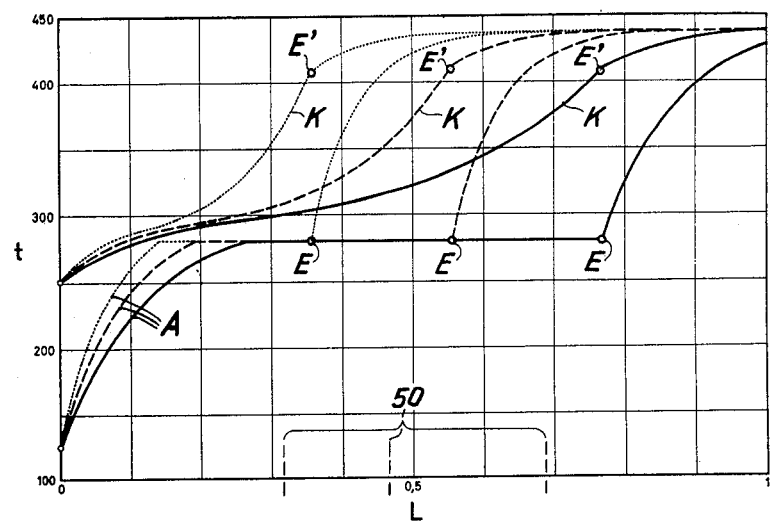

The invention will now be further described in detail with reference to the accompanying drawings and in terms of exemplary embodiments as follows:

FIG. 1 is a diagram of a first form of apparatus for carrying out the method of invention in which the reactor output is adjusted in dependence upon the fresh steam pressure in the steam flow circuit of the working substance, whereas the supplementary signal (i.e. supplementary to that representing the temperature of the reactor cooling medium on exit from the heat exchanger) is derived from the rate of rotation of the reactor cooling medium pump;

FIG. 2 is a diagram of a system similar to that of FIG. 1 in which according to a further feature of the invention, rate of change of temperature measuring devices are provided in the heat exchanger;

FIG. 3 in a diagram of a further embodiment according to the invention in which the reactor output is programmed in advance and wherein the signal supplementary to that representing the exit temperature of the cooling medium from the reactor is provided either by the rate of flow of neutrons in the reactor or from a device measuring the rate of flow of the reactor cooling medium or both; and FIG. 4 is a plot of the variation of the temperatures of the gaseous reactor cooling medium and of the working substance in their distribution through the length of the heat exchanger, in a system according to the invention. The temperatures are indicated in degrees C. along the axis of ordinates whereas the length of the heat exchanger (i.e. in the anti-parallel directions of flow of the reactor cooling medium and system working substance therethrough) is represented along the axis of abscissae, the total length representing unity. The parameter distinguishing the various curves is load, the curves given being for load conditions of one-fourth, one-half and full load, all for constant steaming pressure of the working substance. The points E represent the steaming end points of the working substance at the corresponding temperatures, and the E' points represent the corresponding temperatures of the reactor cooling medium.

Corresponding reference characters identify similar parts in all figures.

Referring to FIG. 1, there are there shown a reactor 1 and a heat exchanger 2 which are coupled together for flow of the reactor cooling medium by means of conduits 3 and 4. The heat exchanger 2 is supplied with working substance from the starting vessel 5 via the pump 6 and feedwater supply valve 7. The working substance is preheated in the heat exchanger 2 and is moreover there vaporized and superheated. It flows thence through the conduit 8 and valve 9 to a heat engine load such as the turbine 10. The valve 9 is adjusted in setting in response to the indications of the revolution counter 14 on the turbine, via a proportionally and integrally operating controller 15. The turbine 10 drives a generator 16.

The working substance emerging from the turbine is condensed in a condenser 11 and is returned to the starting vessel 5 by operation of a condensate pump 12, passing thence first through a preheater 13 before reaching the starting vessel 5.

In the figures there is shown only one loop or flow circuit for the reactor cooling medium and one loop or flow circuit for the working substance which flows through the heat exchanger. It is however possible to employ the invention in installations wherein plural circuits are provided for the reactor cooling medium and/or for the working substance, in which case desirably a separate heat exchanger is provided for each pair of associated reactor cooling medium and working substance circuits. Alternatively, all cooling medium and working substance circuits may operate together from a single heat exchanger. Moreover the working substance circuits may be arranged to drive either a single turbine or plural turbines, which may be connected in parallel or which may operate independently of each other.

The operation of the system, which as thus far described is known per se, takes place in the following manner.

A reference value signal for the reactor power output is developed in a controller 21 from a signal originating in the fresh steam pressure measuring device 20. The signal from the controller 21 operates on a neutron flow controller 22 having a proportionally and integrally operating characteristic. The controller 22 receives in addition a signal representative of the actual neutron flow in the reactor, developed in the neutron flow measuring device 23. The output signal of controller 22 is applied to the neutron generation or moderator control rod shift mechanism 24. The flow of cooling medium through the reactor is determined by a pumping device 25 which responds to a reactor exit temperature signal developed at the temperature measuring device 26, after transformation in a proportionally and integrally operating controller 27. The pump 25 further receives as a supplementary signal the output signal from the neutron flow measuring device 23 after passing through a differentiating element 28, which may however have instead a proportionally and differentially operating characteristic. The supply of this supplementary neutron flow signal to the pump 25 is made in order that the cooling medium flow may be adjusted as promptly as possible to a change in neutron flow, before the slowly changing though ultimately dominant control signal from the proportionally and integrally operating regulator 27 comes into effect.

The rate of flow of working substance through the heat exchanger 2 is adjusted in known fashion by a signal developed from the reactor coolant temperature measuring device 30, as modified in a slow responding proportionally and integrally operating controller 31 whose output is applied to the servo-motor (not shown) which adjusts the setting of the feedwater supply valve 7. The valve setting thus specified is detected in a measuring device 32 and operates to set the speed of pump 6, after passage through a proportionally operating signal transformer 33.

According to the invention, a supplementary signal is applied to control of the valve 7 and hence to control of the rate of flow of working substance through the exchanger. This signal is developed by a device 35 responsive to the rate of rotation of the pump 25. The signal thus developed by the device 35 is substantially proportional to the average rate of flow of reactor cooling medium and it is applied to the servo-motor driving valve 7 via a proportionally operating element 36.

By means of this supplementary signal, deriving from the neutron flow measuring device 23 by way of the differentiating element 28, pump 25, rate of revolution counter 35, and proportionally operating element 36, the rate of flow of the working substance through the heat exchanger is adjusted to a changed reactor power output, before a change in power output from the reactor becomes effective via the slowly responding temperature control of the control circuit 30, 31 and 7. As indicated, this arrangement has the advantage that with changes in load on the working substance circuit, changes in the temperature of the cooling medium on exit from the heat exchanger are much reduced, without introduction of instability phenomena such as might be expected if exclusive or preponderant reliance were had instead, for control of the system, on the proportionally and integrally operating controller 31. In other words the reactor is much less exposed to thermal shock.

FIG. 2 shows the same basic circuit as FIG. 1. FIG. 2 shows in addition temperature measuring devices in the heat exchanger 2 which also operate to adjust the rate of flow of working substance through the heat exchanger 2. Specifically to this end, rate of change of temperature measuring elements 51 are provided at three measuring points 50 in the primary side of the heat exchanger traversed by the reactor coolant. These elements 51 measure the rate of change of temperature $dT/dt$ of the reactor cooling medium as it is present in heat exchanger 2 at three points disposed along the direction of flow of that cooling medium. At least one of these positions is in a region where the temperature of the cooling medium varies over a relatively wide range, in order to provide, in the event of a substantial change in that temperature, an indication of the speed of shift of the steaming end point. The measured values so obtained are summed and applied via a proportionally operating element 52 to control of the valve 7 which governs the flow of working substance. The invention is of course not restricted to the summation arrangement indicated but can instead employ a maximum value selection among the plural signals from the elements 51.

Instead of measuring the time rate of change of temperature of the reactor cooling medium as it flows through the heat exchanger, it is possible to measure the temperature of the working substance itself there, either directly or by measurement of the wall temperature of the tubes through which the working substance flows. Such signals may then be employed as input to the element 52, instead of the $dT/dt$ signals shown in FIG. 2.

The curve plot of FIG. 4 shows three exemplary locations 50 for the time rate of change of temperature measuring elements 51. That is, one element 51 is located about 0.32 of the distance, a second about 0.46 of the distance, and the third about 0.68 of the distance along the path of flow of the working substance, between its inlet to and its outlet from the heat exchanger. The dotted line curves in FIG. 4 represent temperature variation at 25% load. Those in dash lines and in full lines represent the same quantity at 50 and at 100% load respectively. The A curves are working substance temperatures and the K curves are reactor cooling medium temperatures. As the positions 50 shown in the figure indicate, there is throughout the range of load conditions illustrated at least one thermal element 51 disposed at a location where the reactor cooling medium temperature changes relatively rapidly along its flow path through the heat exchanger.

If in place of reactor coolant medium temperature in the heat exchanger there is measured the temperature of the working substance tube walls or that of the working substance itself, the measurement locations 50 can of course be disposed elsewhere in the heat exchanger. As has already been indicated, and as has been confirmed by analogue computer tests, the amplitude of the oscillations in control, as observed for example in terms of steam temperature or steam pressure at the working substance exit from the exchanger, or in terms of reactor cooling medium temperature at the reactor coolant exit from the exchanger, may be substantially reduced by employment of that feature of the invention according to which there is provided a further supplementary signal representative of shift in steaming end point of the working substance. This further supplementary signal is usable only in conjunction with the first supplementary signal representative of reactor load which is provided in accordance with the basic principles of the invention.

The signal or signals representative of shifts of steaming end point are employed to minimize the oscillations incident upon such a shift in the following manner: Consider the case of an increase in load. Upon a sudden increase in load there occurs first a decline in fresh steam pressure, whereby the steaming end point of the working substance, as indicated at E in FIG. 4, is initially moved upstream. By "upstream" here is meant upstream with respect to the flow of working substance through the exchanger. This means, of course, downstream with respect to the flow of reactor cooling medium through the exchanger. In FIG. 4 such a shift means movement of the point E (for the applicable one of the A curves) to the left, toward the origin of coordinates. The reactor coolant temperature change $dT/dt$ measured at the active element 50 of any given one of the devices 51 thereupon assumes a positive value since the initial shift of the steaming end point just mentioned corresponds to a horizontal shift toward the origin of coordinates of one of the K curves in FIG. 4. That is to say, upon such a sudden increase in load, given working substance temperatures are attained at points farther upstream of the heat exchanger (in the sense of flow of the working substance therethrough) than was the case prior to such change in load. Hence, at a given location in the exchanger, this change in exchanger temperature conditions takes the form of a rise in temperature of the reactor cooling medium.

The signal representative of rate of change of temperature is then applied to the working substance flow control element 7 so as to shift the setting of the latter as required to increase the flow of working substance. Consequently, the steaming end point will not move upstream as far as, without this signal (e.g. from elements 50, 51 through element 52 in FIG. 2), would otherwise occur. Rather the steaming end point moves more quickly to its new equilibrium or operating position which is downstream of the previous one in the sense of working substance flow. Since the fresh steam pressure specifies in this embodiment the reactor output (by operation on the reactor moderating rods via elements 20, 21, 22 and 24 in FIGS. 1 and 2), reduction of that pressure immediately operates on the reactor output. The latter is increased, corresponding to the new demand load. The increased neutron flow now measured is at once made effective on the pumping device 25 of the reactor coolant cycle, in the sense required to increase the flow of coolant. The change in neutron flow additionally has a slow and delayed operation via its effect in raising the temperature of the reactor cooling medium at the point 26.

From the signal representative of the rate of rotation of the pump 25 generated at 35 there then occurs via the proportionally operating element 36 a similar rapid upward adjustment of the rate of flow of working substance to the increased reactor output. In this way the steaming end point is again moved downstream in the sense of working substance flow and hence to the right along the axis of abscissae in FIG. 4.

There then occurs at the measurement points 50 a decline in temperature of the reactor cooling medium. This generates at the elements 51 temperature rate of change signals which are effective at the valve 7 in the sense required to reduce the rate of flow of working substance so as to slow down the new change in steaming end point position. Meanwhile the delayed operations of proportional and integral character dependent on the temperature of the reactor coolant medium upstream and downstream of the heat exchanger become effective via the control circuits 26, 27, 25 and 30, 31, 7 respectively. There is thus re-established an equilibrium corresponding to the new demand load. The signal coming from the measurement points 50 and operative on the valve 7 thus initially retards the departure or shift of the steaming end point in upstream direction, and after the proportional signal from the control circuit 35, 36, 7 becomes effective, it similarly slows or diminishes the downstream shift in steaming end point.

In similar fashion this signal also operates to reduce the amplitude of the oscillations of other control quantities as, for example, steam temperature, steam pressure, or reactor coolant temperature downstream of the heat exchanger. The operation together of the various control circuits is extremely complex and it is substantially impossible to analyze the operations and interdependencies thereof in qualitative fashion.

Since the signal from the measurement devices 50 is determined by the temperature of the reactor coolant stream in the heat exchanger 2, this signal becomes promptly effective upon change in load, but with sufficient delay so that the control does not become unstable.

FIG. 3 shows in contrast to FIGS. 1 and 2 a number of variants in the makeup of the control arrangement. An interchange of individual ones of these variations with the corresponding control circuit of FIGS. 1 and 2 is directly possible.

In the embodiment of FIG. 3 the reference or desired value signal for the reactor output is given not by the fresh steam pressure in the working substance cycle but rather by a program device (not shown) delivering its signals through the reference value signal line 54 to the controller 22.

Moreover the exit temperature of the coolant medium from the reactor does not operate directly via the controller 27 on the pump 25 (as in FIGS. 1 and 2), but rather on a high speed coolant flow control circuit comprising a reactor coolant medium rate of flow measuring device 40, a proportionally operating element 41 and the pump 25. Here there is supplied to the element 41 in addition to the signal from controller 27 a signal representative of neutron flow rate delivered through a proportionally operating element 55. The element 55 thus replaces the differentiating element 28 in FIGS. 1 and 2.

Additionally the measured value for the reactor output, which according to the invention operates via proportional element 36 on the valve 7 of the working substance circuit, is derived in the embodiment of FIG. 3 from the neutron flow rate measuring device 23 and/or from the rate of coolant flow measurement element 40, instead of being derived from the rate of pump rotation counter 35 of FIGS. 1 and 2.

Finally the change of temperature measuring devices 51 have in the embodiment of FIG. 3 been replaced by temperature measuring devices 56 in the reactor coolant gas stream within the heat exchanger. The temperatures here measured are summed and passed via differentiating elements 57 for control of the valve 7 of the working substance cycle.

As already indicated the differentiating element 57 can in this embodiment be replaced with a proportionally operating element so that there may be employed not only a signal representative of the rapidity of steaming end point shift but also one representative of the actual position of the steaming end point, in accordance with the invention. The influence of the temperature measurement, by comparison to the slow integrating-type operation of the control circuit 30, 31, 7 nevertheless occurs rapidly enough so as to achieve the desired reduction in amplitude of control oscillations. In other respects, the mode of operation of FIG. 3 is substantially the same as that described in connection with FIG. 2.

While the invention has been described in terms of a number of preferred embodiments, the spirit and scope of the invention itself is rather set forth in the appended claims.

The sense in which various parameters of the system are changed in response to changes of specified sense in other parameters will be explained by some examples now:

As *t* (26), for example, rises, rate of rotation of 25 increases; or
As *t* (30) rises, valve 7 opens;
As rate of rotation *n* (35) rises, valve 7 opens;
As neutron flow increases (signal at 23), pump 25 speeds up;
As *p* (20) declines, reactor activity increases;
As *n* (14) increases, valve 9 closes;
As valve 7 opens, pump 6 speeds up (via elements 32, 33); and/or
As steaming end point shifts upstream, valve 7 increases its opening at least temporarily.

I claim:
1. In the operation of a nuclear power plant having a heat exchanger through which a reactor coolant flows to deliver heat to a vaporizable working substance, the method of control which comprises adjusting the rate of flow of coolant as a function of reactor exit coolant temperature, adjusting the rate of flow of working substance as a function of exchanger exit coolant temperature, and further adjusting the rate of flow of working substance as a function of reactor power output.

2. In the operation of a nuclear power plant having a heat exchanger through which a reactor coolant flows to deliver heat to a vaporizable working substance, the method of control which comprises adjusting the rate of flow of coolant as a function of reactor exit coolant temperature, adjusting the rate of flow of working substance as a function of exchanger exit coolant temperature, and further adjusting the rate of flow of working substance as a function of reactor coolant flow.

3. In the operation of a nuclear power plant having a heat exchanger through which a reactor coolant flows to deliver heat to a vaporizable working substance, the method of control which comprises adjusting the rate of flow of coolant as a function of reactor exit coolant temperature, adjusting the rate of flow of working substance as a function of exchanger exit coolant temperature, and further adjusting the rate of flow of working substance as a direct function of reactor power output.

4. In the operation of a nuclear power plant having a heat exchanger through which a reactor coolant flows to deliver heat to a vaporizable working substance, the method of control which comprises adjusting the rate of flow of coolant as a function of reactor exit coolant temperature, adjusting the rate of flow of working substance as a function of exchanger exit coolant temperature, and further adjusting the rate of flow of working substance as a direct function of neutron flow in the reactor.

5. In the operation of a nuclear power plant having a heat exchanger through which a reactor coolant flows to deliver heat to a vaporizable working substance, the method of control which comprises adjusting the rate of flow of coolant as a function of reactor exit coolant temperature, adjusting the rate of flow of working substance as a function of exchanger exit coolant temperature, further adjusting the rate of flow of working substance as a direct function of reactor output, and further adjusting the rate of flow of working substance with change in the location of the steaming end point of said working substance in the heat exchanger.

6. In the operation of a nuclear power plant having a heat exchanger through which a reactor coolant flows to deliver heat to a vaporizable working substance, the method of control which comprises varying the rate of flow of coolant as a direct function of reactor exit coolant temperature, varying the rate of flow of working substance as a direct function of exchanger exit coolant temperature, further varying the rate of flow of working substance as a direct function of the rate of flow of reactor coolant, and further varying the rate of flow of working substance as a direct function of the distance between the working substance exit from the exchanger and the steaming end point of the working substance in the exchanger.

7. A nuclear power plant comprising a reactor, a heat exchanger, means to circulate a reactor coolant in a closed cycle through the reactor and through the primary side of the heat exchanger, means to drive a vaporizable working substance through the secondary side of the exchanger and to a heat-engine load, means to change the flow of coolant in said cycle directly with changes in reactor exit coolant temperature, means to change the flow of working substance through said exchanger directly with changes in exchanger exit coolant temperature, and supplementary means to change the flow of working substance through said changer directly with changes in reactor power output.

8. A nuclear power plant comprising a reactor, a heat exchanger, means to circulate a reactor coolant in a closed cycle through the reactor and through the primary side of the heat exchanger, means to drive a vaporizable working substance through the secondary side of the exchanger and to a heat-engine load, means to change the flow of coolant in said cycle directly with changes in reactor exit coolant temperature, means to change the flow of working substance through said exchanger directly with changes in exchanger exit coolant temperature, and supplementary means to vary the flow of working substance through said exchanger directly with the flow of reactor coolant.

9. A nuclear power plant comprising a reactor, a heat exchanger, means to circulate a reactor coolant in a closed cycle through the reactor and through the primary side of the heat exchanger, means to drive a vaporizable working substance through the secondary side of the exchanger and to a heat-engine load, means to change the flow of coolant in said cycle directly with changes in reactor exit coolant temperature, means to change the flow of working substance through said exchanger directly with changes in exchanger exit coolant temperature, and supplementary means to vary the flow of working substance through said exchanger directly with the neutron flux in the reactor.

10. A nuclear power plant comprising a reactor, a heat exchanger, means to circulate a reactor coolant in a closed cycle through the reactor and through the primary side of the heat exchanger, means to drive a vaporizable working substance through the secondary side of the exchanger and to a heat-engine load, means to change the flow of coolant in said cycle directly with changes in reactor exit coolant temperature, means to change the flow of working substance through said exchanger directly with changes in exchanger exit coolant temperature, and supplementary means to vary the flow of working substance through said exchanger directly with the rate of operation of said circulation means.

11. A nuclear power plant comprising a reactor, a heat exchanger, means to circulate a reactor coolant in a closed cycle through the reactor and through the primary side of the heat exchanger, means to pump a vaporizable working substance through the secondary side of said exchanger and to deliver it to a load, means to adjust the activity of said reactor as an inverse function of pressure of said working substance upon exit from said exchanger, means to adjust the rate of circulation of said coolant as a direct function of reactor exit coolant temperature, means to adjust the rate of pumping of said working substance as a direct function of exchanger exit coolant temperature, supplementary means to adjust the rate of pumping of said working substance as a direct function of the rate of circulation of said coolant, and further supplementary means to adjust the rate of pumping of said working substance as a direct function of temperature at a selected point in said exchanger.

References Cited by the Examiner
UNITED STATES PATENTS 3,070,536   12/1962   Taylor et al. _____ 176—60

FOREIGN PATENTS 811,856   4/1959   Great Britain.

LEON D. ROSDOL, *Primary Examiner.*

CARL D. QUARFORTH, *Examiner.*

M. R. DINNIN, *Assistant Examiner.*